(12) United States Patent
Shiono et al.

(10) Patent No.: US 6,302,598 B1
(45) Date of Patent: Oct. 16, 2001

(54) CAMERA HAVING A BARRIER

(75) Inventors: Junji Shiono, Yokohama; Moriya Katagiri, Tokyo, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/354,009

(22) Filed: Jul. 15, 1999

(30) Foreign Application Priority Data

Jul. 16, 1998 (JP) ................................................. 10-201966

(51) Int. Cl.[7] .............................. G03B 5/02; G03B 17/00
(52) U.S. Cl. ............................................. 396/349; 396/448
(58) Field of Search .................................... 396/348, 349, 396/350, 448

(56) References Cited

U.S. PATENT DOCUMENTS

| | | | |
|---|---|---|---|
| 3,685,414 | * 8/1972 | Good | 396/396 |
| 5,895,136 | * 4/1999 | Grant et al. | 396/448 |
| 6,086,266 | * 7/2000 | Fujisaki | 396/448 |

FOREIGN PATENT DOCUMENTS

| | | |
|---|---|---|
| 6-102570 | 4/1994 | (JP) . |
| 10-148870 | 6/1998 | (JP) . |

* cited by examiner

Primary Examiner—David M. Gray
(74) Attorney, Agent, or Firm—Frishauf, Holtz, Goodman, Langer & Chick, P.C.

(57) ABSTRACT

A small camera having a barrier is provided with holding mechanism of a barrier position that requires little space. The holding mechanism includes an elastic member (click spring) having a U-shaped engaged portion (claw) urged toward, for example, a front cover of the camera body. The elastic member is fixed to a back surface of a barrier. A concave engaging portion (click spring insertion hole) engaged with the engaged portion of the elastic member is formed in the front cover of the camera body. The barrier is movable between a closing position covering a photographing lens and an opening position retreated from the closing position. When the barrier has been moved to reach the closing position or the opening position, the barrier is firmly held stationary by the force imparted to the elastic member.

5 Claims, 4 Drawing Sheets

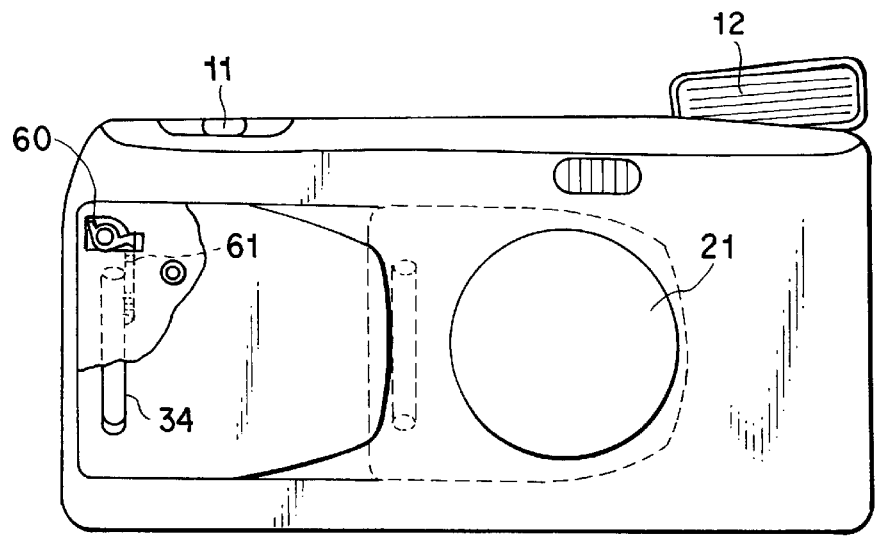
FIG. 5
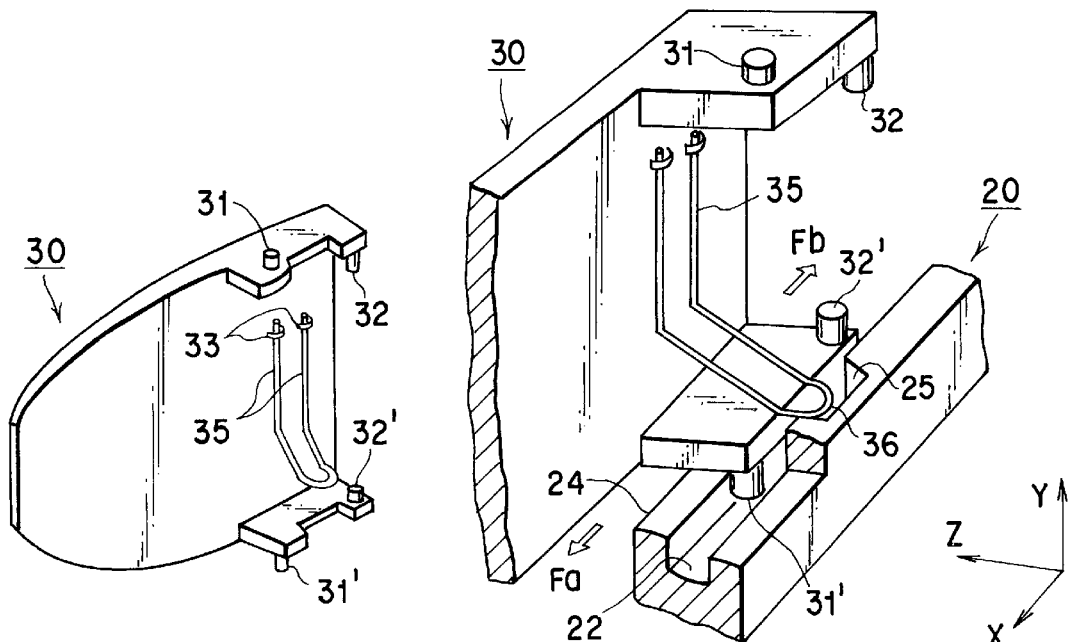
FIG. 6
FIG. 7

CAMERA HAVING A BARRIER

BACKGROUND OF THE INVENTION

The present invention relates to a camera having a position holding mechanism for holding the opening-closing position of a barrier.

The conventional position holding mechanism uses a click. For example, Japanese Patent Disclosure (Kokai) No. 6-102570 proposes a click mechanism comprising a ball and a spring. It is proposed that the ball and the spring are used in combination for stopping the barrier of a camera at a predetermined position.

Japanese Patent Application No. 8-307765 discloses a click mechanism using a wire spring. The click mechanism includes a metal wire having a circular cross section, which is used as a cantilever beam perpendicular to the opening-closing direction of the barrier. The wire is, for example, a linear member of a predetermined length and having a circular cross section, which does not require a bending treatment. One end portion of the wire is pressed into the structure and a support is formed midway along of the wire.

In the conventional click mechanism disclosed in, for example, JP No. 6-102570 noted above, it is certainly possible to make the camera compact by using the combination of the barrier for a collapsible mount type camera and the switch interlocked with the barrier. However, it is difficult to assemble the combination of a plurality of click balls and the click spring proposed in this prior art. Also, the degree of compactness achieved is limited because a space larger than the diameter of the click balls used is required.

In the click mechanism proposed in JP No. 8-307765 noted above, moreover the wire spring used comprises a linear rod-like member and, thus, the processing labor can be diminished. However, it is necessary and difficult to ensure a space of the click portion for receiving the wire spring. In addition, there is an inconvenience that the click portion for the barrier is positioned in the space for moving other members.

BRIEF SUMMARY OF THE INVENTION

An object of the present invention is to provide a holding mechanism of a barrier position which requires little space in for a small camera.

According to the present invention, which is intended to achieve the above-noted object, there is provided a camera provided with a barrier movable between a closing position at which a photographing lens is covered with the barrier and an opening position retreated from the photographing lens, comprising an elastic member mounted to a back surface of the barrier and having a U-shaped engaged portion urged toward a camera body, and a concave engaging portion mounted on the side of the camera body for engagement with the engaged portion of the elastic member when the barrier is moved to the closing position or the opening position.

The elastic member is bent at predetermined portions other than the U-shaped engaged portion. Also, the elastic member is bent at predetermined positions such that a plane including the U-shaped engaged portion is parallel with the optical axis of the photographing lens.

In the present invention, a click spring is mounted on the side of the barrier. The click spring is formed of a wire material having a circular cross section and a thickness not larger than half the thickness of the conventional click spring and is bent in a U-shape. The click spring is fixed to a back surface of the barrier, and a claw at the tip of the click spring is inserted into a side wall of a rail groove (or slide groove) formed in the front cover facing the back surface of the barrier, thereby holding the barrier at a desired position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A to 4E are cross sectional views showing the front surface of the camera including a barrier and a rail cover, wherein, FIG. 4A is a cross sectional view along line 4A—4A shown in FIGS. 1 and 3, FIG. 4B is a cross sectional view along line 4B—4B shown in FIGS. 1 and 3, FIG. 4C is a cross sectional view along line 4C—4C shown in FIG. 2, FIG. 4D is a cross sectional view alone line 4D—4D shown in FIG. 2, and FIG. 4E is a cross sectional view along line 4E—4E shown in FIG. 3;

FIG. 5 is a front view, partly broken away, showing the barrier and the front cover of a camera of the present invention;

FIG. 6 is an oblique view showing the back structure of the barrier included in a camera of the present invention; and FIG. 7 is an oblique view schematically showing how the barrier is moved along the rail groove of the front cover in a camera of the present invention.

DETAILED DESCRIPTION OF THE INVENTION

A camera of the present invention will now be described with reference to the accompanying drawings.

Figure 1:
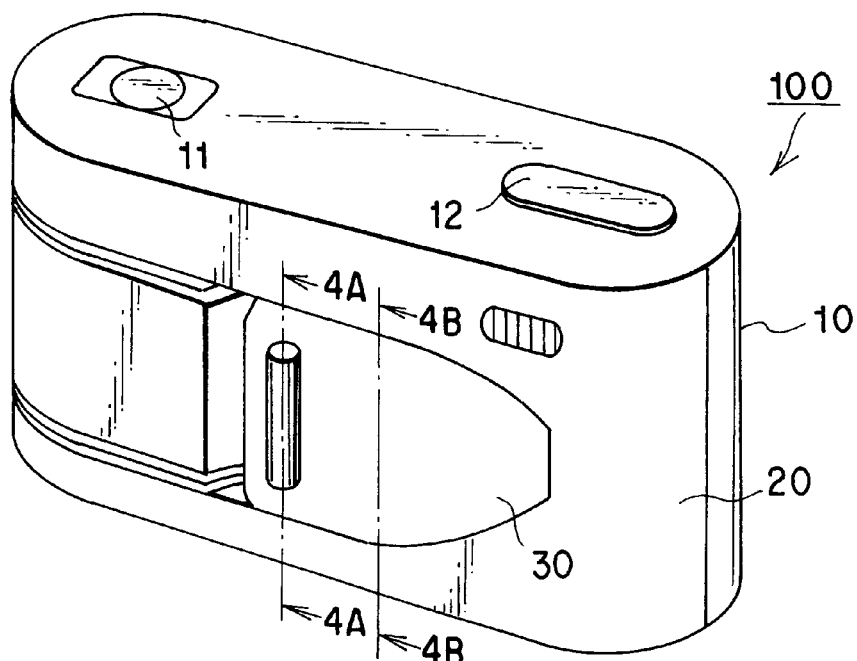
FIG. 1 is an oblique view showing an outer appearance of a camera of the present invention in which a barrier is in a closing position.
Figure 2:
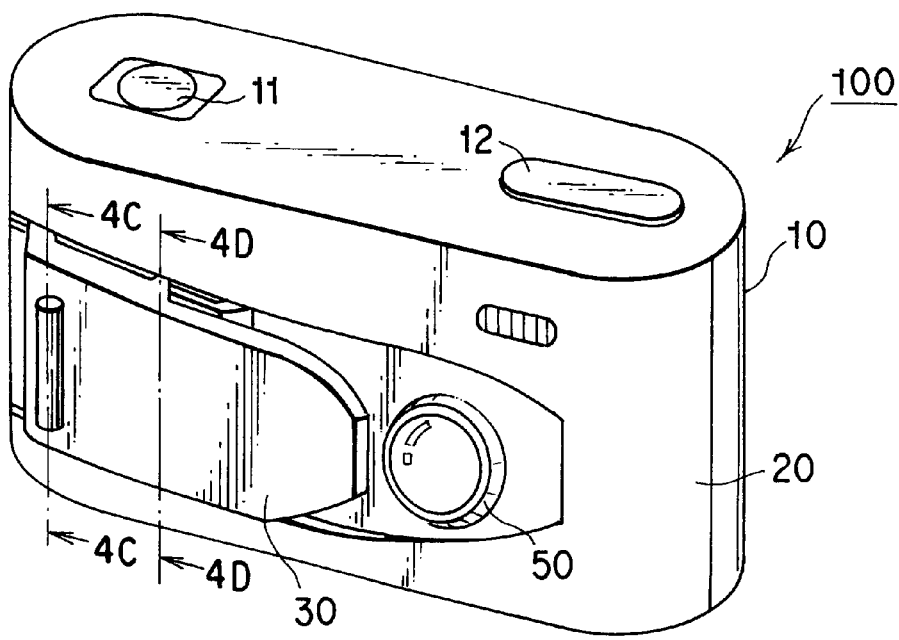
FIG. 2 is an oblique view showing an outer appearance of a cameral in which the barrier has been opened.

Specifically, FIG. 1 shows an outer appearance of a camera in which a barrier 30 is in a closing position, and FIG. 2 shows the barrier 30 in an opening position. As shown in the drawings, the camera comprises a collapsible mount type camera body 100 including a rear cover 10, a front cover 20 and a camera gist portion, i.e., circuit board and various mechanisms, held between the rear cover 10 and the front cover 20. A release button 11 and a flash 12 that can be projected when used are mounted on the upper surface of the camera body 100. Also, a lens barrel 50 collapsed inside the camera body 100 is selectively projected forward of the camera body 100 by moving the barrier 30 movably mounted on the front surface of the camera body 100 to a predetermined opening position. To be more specific, the barrier 30 is held by a holding mechanism at a closing position where the lens barrel 50 is covered with the barrier 30 as shown in FIG. 1 or at an opening position where the lens barrel 50 is allowed to project to perform a zooming function, etc. as shown in FIG. 2.

Figure 3:
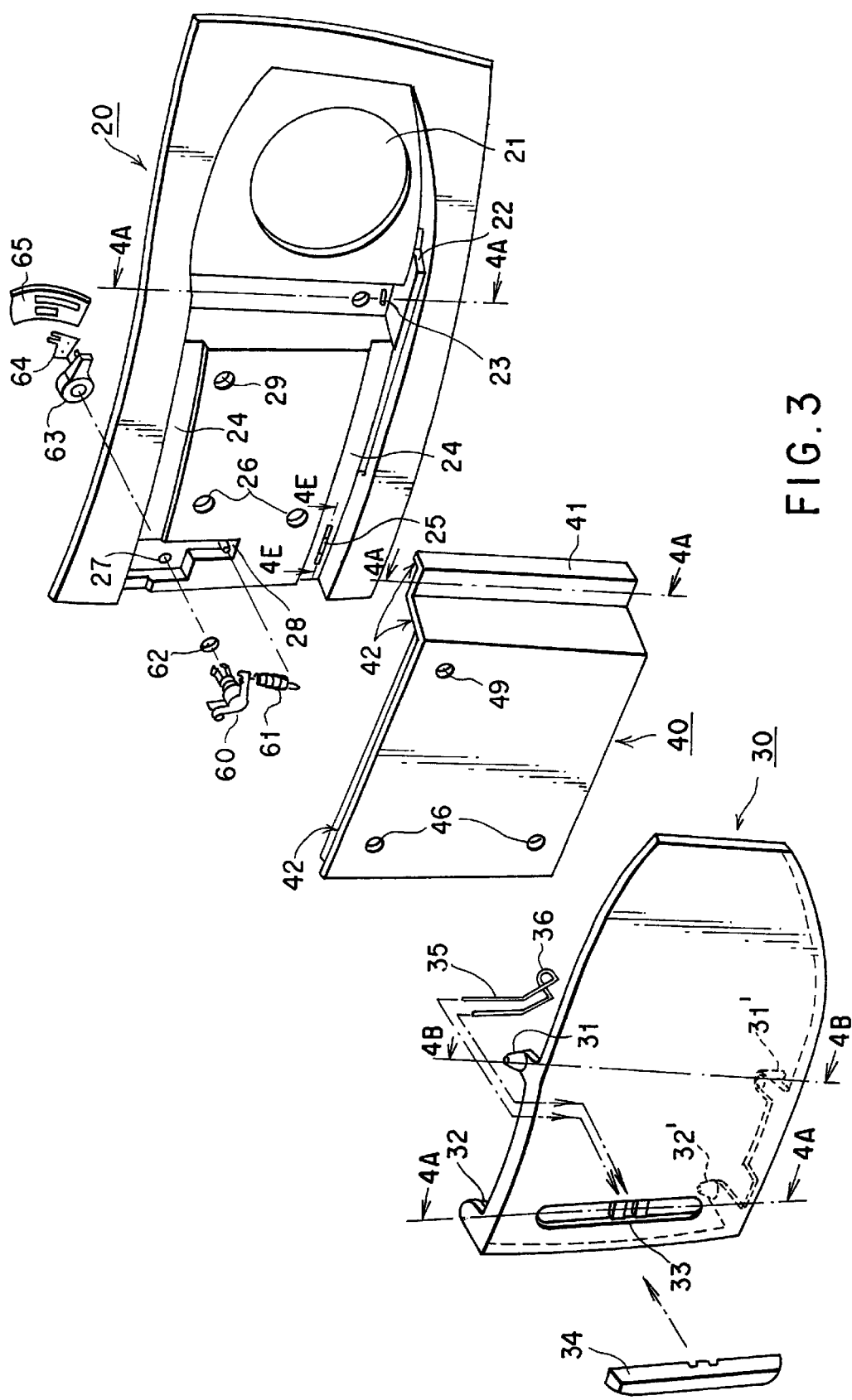
FIG. 3 shows in a dismantled fashion a barrier and a rail cover mounted to the front surface of a camera.

FIG. 3 shows in a dismantled fashion how the barrier 30 and a rail cover 40 are mounted to the front surface of the front cover 20 of the camera body 100. As shown in the drawing, a lens barrel hole 21 through which the lens barrel (not shown) is mounted and upper and lower rail grooves 22 (of which only the lower rail groove 22 is shown in FIG. 1) are formed in the front cover 20. The r ail cover 40 having edge portions conforming with the rail grooves 22 are mounted to the front cover 20. Further, the barrier 30 is mounted to the front cover 20 with the rail cover 40 interposed therebetween. The rail cover 40 is a rectangular cover member having a bent portion 41, having an inclined surface 42 for the rail formed on the upper and lower edge portions on the back surface, and provided with mounting holes 46 and 49.

The front cover 20 is provided with click spring insertion holes 23, 25 for inserting a click spring 35, which is to be described herein later, upper and lower rail planes 24 forming rails together with the inclined surfaces 42 for the rails mounting holes 26, 29, and a spring supporting section 28. Further, a switch shaft 60 interlocked with a main switch (not shown) of the camera so as to be rotated is mounted to the front cover 2 0. One end of the switch shaft 60 is urged by a spring 61 to permit the switch shaft 60 to extend through an elastic ring 62 made of, for example, rubber and through a shaft insertion hole 27 so as to be joined to a contact piece 63. An electrical contact piece 64 is mounted to the contact piece 63 and an electrical contact extending from the electrical contact piece 64 abuts against an electric substrate 65.

Barrier pins 31, 31' projecting outward in the vertical direction and acting as sliders are mounted in upper and lower edge portions on the back side of the barrier 30. Also, barrier pins 32, 32' projecting inward in the vertical direction are mounted in upper and lower end portions of the barrier 30. Further, a vertical mounting hole 33 for mounting a barrier decorating member 34 is formed on the front surface of the barrier 30, said mounting hole 33 being positioned adjacent to the barrier pins 32, 32'.

A click spring 35, which is bent at a plurality of portions as shown in the drawing, is fixed to the back surface of the barrier 30 such that a claw 36 at the tip faces the camera body and the two edge portions of the click spring 35 are inserted into the mounting hole 33 of the barrier decorating member 34.

As will be described in detail herein later, the present invention is featured in that, when the click spring 35 is mounted to the barrier 30, the claw 36 at the tip of the click spring 35 is inserted into the click spring insertion holes 23, 25 formed in the side wall of the lower rail plane 24 formed in the front cover 20 so as to hold the barrier 30 at a desired position.

The claw 36 at the tip of the click spring 35 is moved along the edge portion of the front cover 20 so as to be inserted into the click spring insertion holes 23, 25. Each of the click spring insertion holes 23, 25 comprises a recess shaped to have a width and a depth sufficient to permit insertion of the claw 36. The side along which the claw 36 is guided for insertion into the hole 25 is inclined to have an acute angle of, for example, about 45° to about 60°, as shown in a magnified fashion of cross sectional shape in FIG. 4E. Therefore, the claw 36 is slid so as to be inserted into an insertion hole 25'. Then, the claw 36 is moved again along the moderately inclined surface by a sliding force larger than a predetermined force so as to be inserted into the insertion hole 25. As a result, the barrier 30 is firmly held at the opening position. The click spring insertion hole 23 is also shaped similarly so as to hold the barrier 30 firmly at the closing position.

FIGS. 4A to 4D show cross sectional shapes of the camera front face including the barrier 30 and the rail cover 40 at a plurality of positions.

Figure 4A:
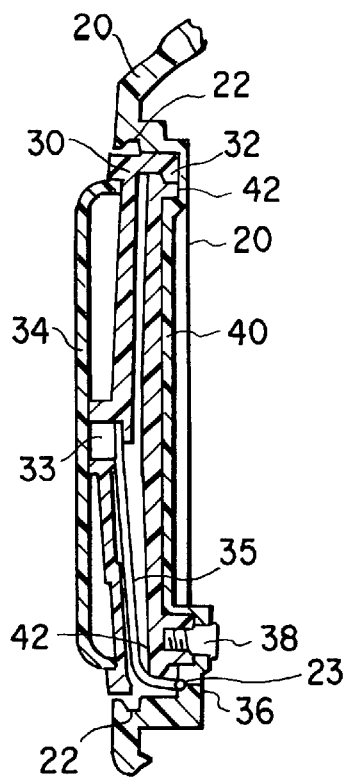

Specifically, FIG. 4A is a cross sectional view along the line 4A—4A shown in each of FIGS. 1 and 3. In this position, the rail cover 40 is fitted into the front recess of the front cover 20. Also, the barrier pin 32 is inserted into the recess for the rail formed in the upper edge portion of the rail cover 40 so as to mount the barrier 30. The barrier 30 is mounted so as to be slidable along the groove formed in the upper edge portion of the rail cover 40.

For mounting the click spring 35 interposed between the rail cover 40 and the barrier 30, the barrier decorating 34 is mounted first to the front surface of the barrier 30. Then, the edge portions of the two wire members of the click spring 35 are inserted from the back surface into the clearance of the mounting hole 33 of the barrier decorating 34. Of course, it is also possible to employ fixation by an adhesive. The click spring 35 forms a mechanism for holding the barrier 30 at a desired position.

Figure 4B:
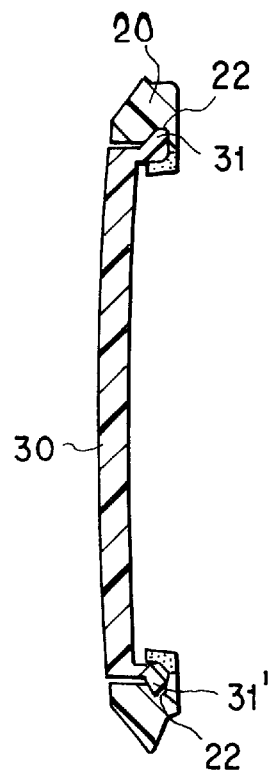

FIG. 4B is a cross sectional view along the line 4B—4B shown in each of FIGS. 1 and 3. The cross section of the switch shaft 60, etc. is omitted in FIG. 4B. As shown in this drawing, the barrier pins 31, 31' are inserted into the rail grooves 22 formed in the front cover 20.

Figure 4C:
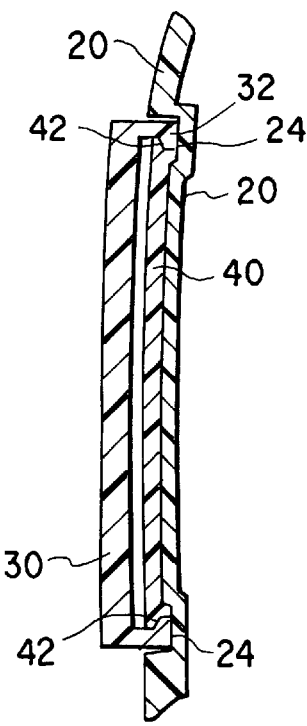

FIG. 4C is a cross sectional view along the line 4C—4C shown in FIG. 2. In the position including the barrier pin 32 (32') shown in this drawing, the rail cover 40 is interposed between the barrier 30 and the front cover 20, and the barrier 30 is mounted so as to be slidable along the groove formed in the upper edge portion of the rail cover 40.

Figure 4D:
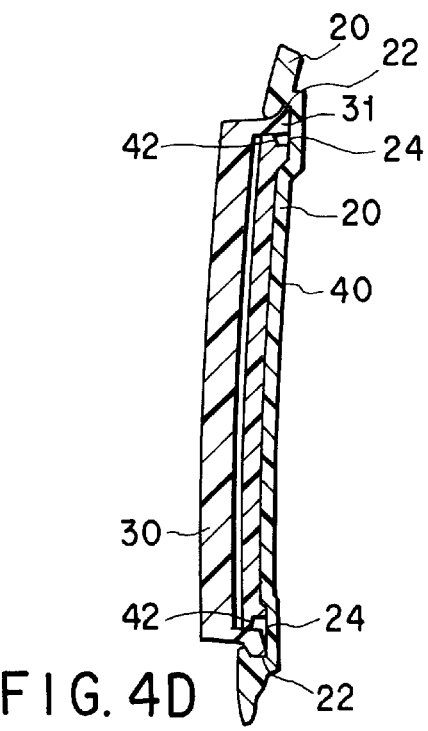

Further, FIG. 4D is a cross sectional view along the line 4D—4D shown in FIG. 2. As shown in this drawing, the rail cover 40 is interposed between the barrier 30 and the front cover 20, and the barrier 30 is mounted so as to be slidable along the grooves formed in the upper and lower edge portions of the rail cover 40 in the position including the barrier pin 31 (31').

FIG. 5 is a front view, partly broken away, showing the camera 100. In the drawing, the barrier 30 and the front cover 20 are partly broken away. As shown in the drawing, the switch shaft 60 and a spring 61 serving to limit the rotation of the switch shaft 60 are incorporated immediately before the front cover 20. The switch shaft 60 is rotated in accordance with movement of the barrier 30 in the horizontal direction to the opening and closing positions. The rotation of the switch shaft 60 causes deformation of the spring 61. It follows that the switch shaft 60 once rotated is automatically brought back to the original position by the elastic force of the spring 61.

In general, a user of the camera puts his finger on the barrier decorating 34 for manually sliding the barrier 30. In this case, the barrier 30 is held stationary at the completely opening position denoted by a solid line or at the completely closing position denoted by a broken line.

As shown in the drawings, the barrier 30 slides in both directions denoted by an arrow along the rails formed by the rail planes 24 of the front cover 20 corresponding to the upper and lower edges of the barrier 30 and the inclined planes 42 for the rails so as to be moved to the closing position at which the photographing lens (not shown) is covered with the barrier 30 and to the opening position retreated from the photographing lens.

The rail planes 24 of the rails start from a position corresponding to a left edge portion of the barrier 30 in the opening position and extends substantially linearly along the edge portions of the front cover 20 to reach a shallow S-shaped bent portion slightly before a position corresponding to a right edge portion of the barrier 30 in the opening position.

The rail grooves 22 are formed in symmetry in the upper and lower edge portions of the front cover 20. And the barrier pins 32, 32' slide along the upper and lower rails. Likewise, the barrier pins 31, 31' slide within the rail grooves 22. By this movement, the barrier 30 is moved in parallel with the front surface of the photographing lens so as to open or close the hole 21 for the lens barrel 50. In accordance with movement of the member, i.e., the switch shaft 60, interlocked with the movement of the barrier 30, the main switch of the camera is turned on or off. If the main switch is turned on, the lens barrel 50 extends forward from the camera body. If the main switch is turned off, the lens barrel 50 is collapsed within the camera body.

FIG. 6 is an oblique view, as seen from the back side, showing the barrier 30 equipped with the click spring 35 as an elastic member.

As described previously, the barrier 30 arranged in front of the front cover 20 of the camera 100 is slidable between the closing position in which the front surface of the lens barrel 50 collapsed inside the camera body 100 is covered with the barrier 30 and the opening position retreated from the closing position to permit the lens barrel 50 to be projected forward when the camera performs the photographing operation.

As shown in FIG. 6, the click spring 35 is an elastic member made of a relatively thin wire having a diameter of about 0.5 mm and including a U-shaped edge portion 36. The elastic member is also bent at, for example, two portions other than the U-shaped engaged portion in predetermined angles.

To be more specific, the elastic member is bent at two portions to permit a plane including the U-shaped engaged portion to be in parallel with the optical axis of the lens. The two free end portions of the elastic member are fixed to the back surface of the barrier 30. Preferably, these free end portions are inserted from below into the clearance of the vertical hole 33 for mounting the barrier decorating 34 (see FIG. 4A).

As described above, the click spring 35 is supported at one end portion by the barrier 30 and extends vertically downward along the back surface of the barrier 30. Further, the click spring 35 is bent to permit the tip portion to be apart from the back surface of the barrier 30. Clearly, that portion of the click spring 35 including the tip portion which is apart from the back surface of the barrier 30 is elastically urged.

The tip portion of the click spring 35 includes a U-shaped claw, i.e., engaged portion, extending toward the camera body 100. The claw is engaged with the click spring insertion hole 25 acting as an engaging portion so as to hold the barrier 30 temporarily in the opening position or the closing position.

As shown in FIG. 7, the barrier 30 is moved along the rail groove 22 of the front cover 20 by force Fa serving to move the barrier 30 toward the closing position or force Fb serving to move the barrier 30 toward the opening position. In other words, the barrier 30 is slid in a horizontal direction substantially perpendicular to the optical axis (not shown, Z-axis direction) of the lens barrel 50.

Figure 4E:
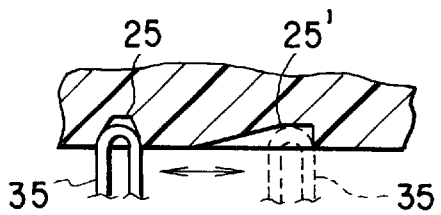

The click spring insertion hole 25, i.e., a concave engaging portion, is formed in the side surface on the lower side of the front cover 20 as shown in FIG. 4E. When the barrier 30 is moved to the closing position or the opening position, the engaged portion, i.e., the claw 36, of the click spring 35. acting as the elastic member is inserted into the concave click spring insertion hole 25 (engaging portion) so as to hold the barrier 30 at a desired position.

The elastic force of the click spring 35 mounted to the barrier 30 urges the click spring 35 in a Z-axis direction (horizontal direction) and a Y-direction (vertical direction) in which a manual operating force is indirectly exerted through the front cover 20. If the barrier 30 is moved in the closing direction along the S-shaped rail grooves 22 formed in the front cover 20, the claw 36 of the click spring 35 is firmly inserted into the insertion hole 23 by the urging force so as to ensure the closing position.

Likewise, if the barrier 30 is moved in the opening direction along the rail grooves 22, the claw 36 of the click spring 35 is firmly inserted into the other insertion hole 25 by the urging force of the spring 35 so as to ensure the opening position.

As described above, the click spring 35 is bent in a U-shape to divide the force required for the click operation of the barrier 30, which is applied to the click spring 35, into two parts. As a result, the force required for the click operation can be produced sufficiently even if the click spring 35 is formed of a relatively thin wire material or wire spring. In addition, the click spring 35 can be mounted easily and can be manufactured at a low cost because the click spring 35 is small and can be prepared by simply bending a wire material.

It should also be noted that, in order to improve the small allowable bending stress in the fixing method like a cantilever, the wire spring is bent at a plurality of intermediate portions to obtain a sufficiently large force about the first bent portion acting as a fulcrum.

Concerning the bending stress, the length of the arm to the fulcrum can be controlled at a desired value by setting appropriately the bending positions and bending angles. The allowable stress can also be controlled appropriately.

The term "slider" or "sliders" used in the present specification represents the barrier pins 31, 31', 32 and 32'. The term "slider groove" represents the two rail grooves engaged with the barrier pins 31, 31' and the inclined planes 42 for the rails that are engaged with the barrier pins 32, 32'. The term "elastic member" represents the click spring 35. Further, the term "engaged portion" represents the U-shaped tip portion (claw) of the click spring, and the term "engaging portion" represents the click spring insertion hole.

The mounting position of the click spring and the position of the click spring insertion hole can be changed appropriately in view of the mutual functional positional relationship. The shape, material, etc. of the parts of the mechanism can also be changed appropriately. Further, various other modifications can be achieved within the technical scope of the present invention.

As described above in detail, the present invention provides a positional holding mechanism of a barrier, i.e., a barrier click mechanism, that permits production of a required force and also permits a reduction in space to make the mechanism adapted for a small camera at a low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera having a barrier that can be moved between a closing position covering a photographing lens and an opening position retreated from said photographing lens, said camera comprising:
   a camera body;
   a slide groove formed in said camera body;
   a slider that is mounted to said barrier and adapted to be slid within said slide groove;
   a click spring that is mounted to said barrier and that is made of a metallic elastic material formed in a U-shape; and
   at least one concave portion formed in said slide groove;
   wherein the U-shaped portion of said click spring is engaged with said at least one concave portion when said barrier is moved to one of the closing position and the opening position.

2. A camera according to claim 1, wherein a plane including the U-shaped portion of said click spring is in parallel with a direction in which said slide groove is formed in said camera body.

3. A camera according to claim 1, wherein the U shaped portion is elastically displaceable in a direction of an optical axis of said photographing lens.

4. A camera comprising:
   a photographing lens;
   a camera body holding said photographing lens;
   a barrier that is supported by said camera body and that is adapted to be movable between a closing position covering said photographing lens facing a subject and an opening position retreated from at least photographing light flux, said barrier being movable on a plane substantially perpendicular to an optical axis of said photographing lens;
   an elastic member arranged on a surface of said barrier which faces said camera body and having an engaged portion that elastically slides along said camera body in a groove formed in said camera body in accordance with movement of the barrier; and
   an engaging portion formed in said groove of said camera body and adapted to be engaged with the engaged portion of said elastic member in at least one of the closing position and the opening position -so as to impart a position holding force to said barrier;
   wherein said elastic member comprises a wire spring.

5. A camera according to claim 4, wherein the engaged portion of said elastic member comprises a U-shaped bent portion of said wire spring.

* * * * *